United States Patent
Norris et al.

(10) Patent No.: US 6,710,103 B2
(45) Date of Patent: Mar. 23, 2004

(54) CURABLE, POWDER-BASED COATING COMPOSITION INCLUDING A COLOR EFFECT-PROVIDING PIGMENT

(75) Inventors: William C. Norris, Rochester Hills, MI (US); Josef Rademacher, Münster-Hiltrup (DE)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/964,713

(22) Filed: Sep. 27, 2001

(65) Prior Publication Data

US 2003/0060538 A1 Mar. 27, 2003

(51) Int. Cl.[7] .............................. C08J 3/00; C08K 3/20; C08K 3/08; C08L 75/00; C09D 5/29
(52) U.S. Cl. .................... 523/200; 523/171; 523/212; 524/413; 524/430; 524/431; 524/432; 524/433; 524/434; 524/435; 524/437; 524/439; 524/441; 524/449; 524/451
(58) Field of Search ................... 524/413, 430, 524/431, 432, 433, 434, 435, 437, 439, 441, 449, 451; 523/171, 200, 212

(56) References Cited

U.S. PATENT DOCUMENTS

| | | | |
|---|---|---|---|
| 4,434,010 A | 2/1984 | Ash | 106/291 |
| 4,753,829 A | 6/1988 | Panush | 427/385.5 |
| 5,059,245 A | 10/1991 | Phillips et al. | 106/22 |
| 5,084,351 A | 1/1992 | Philips et al. | 428/411.1 |
| 5,135,812 A | 8/1992 | Schmid et al. | 428/403 |
| 5,171,363 A | 12/1992 | Phillips et al. | 106/22 R |
| 5,279,657 A | 1/1994 | Phillips et al. | 106/22 R |
| 5,379,947 A | 1/1995 | Williams et al. | 241/21 |
| 5,552,487 A | 9/1996 | Clark et al. | 525/131 |
| 5,569,539 A | 10/1996 | Avar et al. | 428/457 |
| 5,601,878 A | 2/1997 | Kranig et al. | 427/386 |
| 5,607,504 A | 3/1997 | Schmid et al. | 106/403 |
| 5,639,821 A | 6/1997 | Kranig et al. | 525/31 |
| 5,958,125 A | 9/1999 | Schmid et al. | 106/417 |
| 6,156,115 A | 12/2000 | Pfaff et al. | 106/403 |
| 6,193,794 B1 | 2/2001 | Schmid et al. | 106/415 |

FOREIGN PATENT DOCUMENTS

| | | | |
|---|---|---|---|
| DE | 44 18 490 C2 | 5/1997 | B05D/7/16 |
| DE | 197 07 806 A1 | 9/1998 | C09C/1/00 |
| EP | WO95/17475 | 6/1995 | C09C/1/00 |
| EP | 0 940 451 A1 | 3/1999 | C09C/1/00 |
| EP | 1 174 474 | 7/2001 | C09D/5/03 |
| JP | 06-346007 | 12/1994 | C09D/5/38 |
| JP | 07-16534 A | 1/1995 | B05D/5/06 |
| JP | 08-155384 A | 6/1996 | B05D/5/06 |
| JP | 09-078019 A | 3/1997 | C09D/11/16 |
| JP | 2000-95973 A | 4/2000 | C09D/5/00 |
| WO | WO 99/13012 | 3/1999 | C09D/5/03 |
| WO | WO 99/18161 | 5/1999 | C09D/5/03 |
| WO | WO 99/61529 | 12/1999 | C09C/1/00 |
| WO | WO 01/00738 | 1/2001 | C09C/1/00 |

OTHER PUBLICATIONS

Anonymous: "Plastic application guidelines", Internet Article, online! Apr. 25, 2000 XP002220482 pp. 1–2.
International Search Report PCT/US 02/24217 filed Jul. 25, 2002 pp. 1–4.
English Lanugage Abstract for JP 621 60 172.

*Primary Examiner*—Patrick D. Niland

(57) ABSTRACT

A powder-based coating composition for coating a substrate, having a first color effect, with a film layer is disclosed. Application of the film layer to the substrate produces a second color effect different from the first color effect. The composition includes a powder-based binder and a color effect-providing pigment. The powder-based binder is the reaction product of a resin, having a functional group, and a cross-linking agent reactive with the functional group. The color effect-providing pigment includes a pigment substrate and an inorganic coating. The pigment substrate has first and second substantially parallel and planar surfaces, and the inorganic coating is disposed on the first and second surfaces. The inorganic coating has an index of refraction of 1.8 or less. To produce the second color effect, the inorganic coating and the pigment substrate of the color effect-providing pigment interact with the first color effect of the substrate upon application of the film layer to the substrate.

61 Claims, No Drawings

CURABLE, POWDER-BASED COATING COMPOSITION INCLUDING A COLOR EFFECT-PROVIDING PIGMENT

FIELD OF THE INVENTION

The subject invention generally relates to a curable, powder-based coating composition for coating a substrate. More specifically, the subject invention relates to a curable, powder-based coating composition that includes a powder-based binder and a color effect-providing pigment for coating a substrate that has a first color effect with a film layer. Upon application of the film layer to the substrate, the color effect-providing pigment interacts with the first color effect of the substrate to produce a second color effect that is different from the first color effect of the substrate.

BACKGROUND OF THE INVENTION

Powder-based coating compositions are known in the art. A film layer of such powder-based coating compositions is applied to a substrate throughout various industries, such as the automotive coating industry, for certain functional and aesthetic purposes. U.S. Pat. Nos. 5,379,947; 5,552,487; 5,569,539; 5,601,878; and 5,639,821 all disclose various powder-based coating compositions known in the prior art. It is also known in the art to incorporate conventional pigments, and even conventional flake pigments, specifically mica or aluminum flake pigments, into powder-based coating compositions.

The powder-based coating compositions of the prior art, even those conventional coating compositions that incorporate conventional mica or aluminum flake pigments, are deficient because, upon application of the film layer of the coating composition to the substrate, the film layers of the prior art compositions do not achieve a suitable color effect that varies from an original color effect of the substrate. These prior art compositions cannot attain the suitable color effect because the various pigments incorporated into the powder-based coating compositions, even mica and aluminum flakes, do not appropriately interact with light waves to establish angle-dependent color and lightness effects that are responsible for achieving the suitable color effects. As such, coating systems that rely on such conventional powder-based coating compositions first require application of a color-providing basecoat layer, or other coating layer, that underlies the film layer of the powder-based coating composition to provide the angle-dependent color and lightness effects.

In the interest of eliminating the necessity for any color-providing basecoat layer, and also because the film layers of the prior art compositions do not achieve suitable color effects that vary from the original color effect of the substrate, it is desirable to implement a unique powder-based coating composition that incorporates a color effect-providing pigment interacting with a first color effect of a substrate to produce a second color effect differing from the first color effect. It is also desirable that the powder-based coating composition of the subject invention does not require application of an underlying color-providing basecoat layer to achieve the second color effect.

SUMMARY OF THE INVENTION

A curable, powder-based coating composition is disclosed. The coating composition is utilized for coating a substrate, having a first color effect, with a film layer of the coating composition. Application of the film layer to the substrate produces a second color effect different from the first color effect of the substrate.

The coating composition includes a powder-based binder. The powder-based binder is the reaction product of a resin and a cross-linking agent. More specifically, the resin has a functional group and the cross-linking agent is reactive with the functional group of the resin. The coating composition also includes a color effect-providing pigment. The color effect-providing pigment includes a pigment substrate and an inorganic coating. More specifically, the pigment substrate has first and second substantially parallel and planar surfaces, and the inorganic coating is disposed on at least one of the first and second substantially parallel and planar surfaces of the pigment substrate. Furthermore, the inorganic coating disposed on the pigment substrate has an index of refraction of 1.8 or less.

Application of the film layer of the powder-based coating composition to the substrate allows the inorganic coating, having the index of refraction of 1.8 or less, and the pigment substrate of the color effect-providing pigment to interact with the first color effect of the substrate to produce the second color effect. The subject invention, therefore, provides a unique powder-based coating composition for coating a substrate that incorporates particular color effect-providing pigments to interact with the first color effect of the substrate to produce the second color effect. Accordingly, the coating composition of the subject invention also allows for the elimination of any color-providing basecoat underlying the film layer of the powder-based coating composition.

DETAILED DESCRIPTION OF THE INVENTION

The curable, powder-based coating composition of the subject invention coats at least one surface of a substrate, having a first color effect, with a film layer. It is to be understood that the powder-based coating composition of the subject invention includes exclusively powder-based coating compositions as well as powder slurry-based coating compositions. The first color effect is the original color and original appearance of the substrate. Application of the film layer of the powder-based coating composition to the substrate produces a second color effect that is different from the first color effect of the substrate.

Although metallic substrates, such as automotive body panels, are typical, the powder-based coating composition may be applied to other substrates without varying the scope of the subject invention. By way of example, the powder-based coating composition may be applied to a plastic substrate. Also, the powder-based coating composition of the subject invention is primarily utilized as a powder clearcoat applied to the substrate to produce the second color effect without an underlying color-providing basecoat film layer. The powder-based coating composition of the subject invention may also be utilized with an underlying film layer, such as the underlying color-providing basecoat film layer, where the underlying film layer is actually the substrate to which the film layer of the powder-based coating composition is applied. In other words, the substrate is not required to be a bare automotive body panel.

The powder-based coating composition includes a powder-based binder and a color effect-providing pigment. The color effect-providing pigment is described below. The powder-based binder is a film-forming binder that is the reaction product of a resin and a cross-linking agent. The resin includes a functional group, and the cross-linking agent is specifically reactive with the functional group of the resin. More specifically, the resin of the power-based binder is selected from the group consisting of acrylic resins, epoxy resins, phenolic resins, polyester resins, urethane resins, and combinations thereof. The functional group of the resin is selected from the group consisting of epoxy functional groups, carboxy functional groups, hydroxy functional groups, and combinations thereof. The cross-linking agent reactive with the functional group of the resin is selected from the group consisting of aminoplasts, blocked isocyanates, polycarboxylic acids, acid anhydrides, polyamines, and combinations thereof.

The color effect-providing pigment includes a pigment substrate and an inorganic coating. The subject invention preferably combines from 0.1 to 10 parts by weight of the color effect-providing pigment based on 100 parts by weight of the powder-based binder. The pigment substrate has first and second substantially parallel and planar surfaces, and the inorganic coating is disposed or applied on at least one of the first and second substantially parallel and planar surfaces of the pigment substrate. Preferably, the inorganic coating is disposed or applied on both the first and second substantially parallel and planar surfaces. The pigment substrate is preferably a platelet-shaped pigment substrate. In the context of the subject invention, the terminology platelet-shaped indicates that the pigment substrate is a minute, flattened body. Furthermore, the pigment substrate is preferably selected from the group consisting of metallic pigment substrates, non-metallic pigment substrates, and combinations thereof, depending on the particular embodiment of the subject invention. The inorganic coating also has an index of refraction of 1.8 or less. The inorganic coating and the pigment substrate, and other optional coatings as set forth below, establish a symmetrical, multilayer interference structure of the color effect-providing pigment.

The inorganic coating of the color effect-providing pigment varies depending on the embodiment. A suitable example for the inorganic coating is an inorganic coating including a metal oxide. The inorganic coating may also be selected from the group consisting of metal oxides, magnesium fluoride, and combinations thereof. Further suitable examples for the inorganic coating of the color effect-providing pigment include inorganic coatings selected from the group consisting of silicon oxide, silicon oxide hydrate, aluminum oxide, aluminum oxide hydrate, titanium oxide, titanium oxide hydrate, zinc sulfide, magnesium fluoride, and combinations thereof.

As described below, the inorganic coating and the pigment substrate of the color effect-providing pigment interact with the first color effect of the substrate to produce the second color effect upon application of the film layer of the powder-based coating composition to the substrate. When the color effect-providing pigment is incorporated into the powder-based binder according to the subject invention, the interaction of the inorganic coating and the pigment substrate with the first color effect to produce the second color effect is further defined as interference of light waves. In this embodiment, the interference of the light waves establishes angle-dependent color and lightness effects to achieve the second color effect. The interaction of the inorganic coating and the pigment substrate may also be defined as absorption of light waves to establish the angle-dependent color and lightness effect to achieve the second color effect, or as reflection of light waves to establish the angle-dependent color and lightness effects to achieve the second color effect. In one embodiment of the subject invention, the inorganic coating and the pigment substrate interact with the first color effect of the substrate such that the second color effect is different from the first color effect at least by $\Delta L$ 20.0, $\Delta a$ 10.0, and $\Delta b$ 15.0 as measured according to CIELab color space.

The color effect-providing pigment further includes a reflective, absorbing coating which is at least partially transparent to visible light. For descriptive purposes of the subject invention, use of "at least partially transparent to visible light," throughout the description indicates that the pigment substrate, the inorganic coating, or other coatings that are described in such terms, such as the reflective, absorbing coating introduced immediately above, generally transmit at least 10%, preferably at least 30%, of incident light. The reflective, absorbing coating includes a selectively absorbing metal oxide, or a non-selectively absorbing metal, or both. For descriptive purposes of the subject invention, the terminology metal oxide, as used herein, is also intended to encompass metal dioxides, metal trioxides, and so on. The reflective, absorbing coating is preferably disposed or applied on the inorganic coating.

The color effect-providing pigment further comprises an outer coating disposed or applied on the reflective, absorbing coating. The outer coating is different from the reflective, absorbing coating and preferably includes a selectively absorbing metal oxide. The symmetrical, multilayer interference structure includes the pigment substrate, the inorganic coating, the reflective, absorbing coating, and the outer coating.

In an embodiment where the pigment substrate of the color effect-providing pigment is a metallic pigment substrate, the most preferred metallic pigment substrate is aluminum. Other suitable metallic pigment substrates include, but are not limited to, all metals and alloys in platelet form known as metallic pigment substrates, such as steel, copper, copper alloys including brass and bronze, and aluminum bronze. The aluminum pigment substrate may be a passivated or an unpassivated aluminum pigment substrate. The aluminum pigment substrate preferably has an average particle size of from 5 to 50, preferably from 10 to 20, and most preferably from 13 to 16, microns. Alternatively, the aluminum pigment substrate may have a particle-size distribution where 50% of the aluminum pigment substrate has a particle size of from 13 to 16 microns and where no more than 5% of the aluminum pigment substrate has a particle size of greater than 50 microns.

The inorganic coating disposed on the aluminum pigment substrate preferably comprises a metal oxide. Alternatively, the inorganic coating disposed on the aluminum pigment substrate may be selected from the group consisting of silicon oxide, silicon oxide hydrate, aluminum oxide, aluminum oxide hydrate, and combinations thereof. In either embodiment for the inorganic coating, the inorganic coating has an index of refraction of 1.8 or less, preferably 1.6 or less. Also in either embodiment for the inorganic coating, the inorganic coating disposed on the aluminum pigment has a thickness of from 200 to 600, preferably from 300 to 500, nanometers (nm). It is to be understood that the thickness of the inorganic coating, and all other coatings described in the subject invention, varies as a function of the properties of the components selected for the inorganic coating. For instance, the thickness of an inorganic coating including silicon oxide may differ from the thickness of an inorganic coating including aluminum oxide.

Where the pigment substrate is the aluminum pigment substrate, the color effect-providing pigment optionally further comprises a reflective, selectively absorbing metal oxide. The metal oxide is disposed on the inorganic coating and has an index of refraction of 2.0 or greater and is at least partially transparent to visible light. In such embodiments, the index of refraction of the reflective, selectively absorbing metal oxide is more preferably 2.4 or greater. If present, the reflective, selectively absorbing metal oxide preferably has a thickness of from 1 to 500, more preferably from 10 to 150, nm.

The color effect-providing pigment in this embodiment optionally further comprises an absorbing, outer coating. The absorbing, outer coating is different from the reflective, selectively absorbing metal oxide. Furthermore, the absorbing, outer coating is disposed on the reflective, selectively absorbing metal oxide. Preferably, the absorbing, outer coating is selected from the group of selectively absorbing oxides consisting of iron (III) oxide, chromium (III) oxide, vanadium (V) oxide, titanium (III) oxide, and combinations thereof. Alternatively, the absorbing, outer coating may be selected from the group of non-selectively absorbing oxides consisting of titanium dioxide, zirconium oxide, and combinations thereof. If present, the absorbing, outer coating has a thickness of from 1 to 200, more preferably from 10 to 150, nm.

The symmetrical, multilayer interference structure of the color effect-providing pigment, where the metallic pigment substrate is the aluminum pigment substrate, includes $Fe_2O_3$ as the reflective, selectively absorbing metal oxide, $SiO_2$ as the inorganic coating, Al as the metallic pigment substrate, $SiO_2$ as the inorganic coating, and $Fe_2O_3$ as the reflective, selectively absorbing metal oxide. That is, this color effect-providing pigment has a symmetrical, multilayer interference structure of $Fe_2O_3/SiO_2/Al/SiO_2/Fe_2O_3$. Such color effect-providing pigments having the metallic pigment substrate are commercially available from BASF Corporation, Southfield, Mich. as Variocrom® Magic Red K 4411 (formerly ED 1479) and Magic Gold K 1411, and are set forth in U.S. Pat. No. 5,607,504, the disclosure of which is incorporated herein by reference in its entirety. With Variocrom® Magic Red K 4411, the second color effect is produced as a result of a color shift from red-to-yellow. With Variocrom® Magic Gold K 1411, the second color effect is produced as a result of a color shift from greenish gold-to-reddish gray. It is to be understood that the color shifts that produce the second color effect are primarily driven by the thickness of the $SiO_2$ inorganic coating.

The metallic pigment substrate may also be selected from the group consisting of chromium, nickel, and combinations thereof. If the metallic pigment substrate is chromium or nickel, the color effect-providing pigment, as a whole, has an average particle size of from 5 to 40, preferably from 20 to 40, microns. Alternatively, when the metallic pigment substrate is chromium or nickel, the color effect-providing pigment, as a whole, can have a particle size distribution where no more than 10% of the pigment has a particle size of greater than 50 microns and substantially none of the pigment has a particle size of greater than 125 microns.

In this embodiment, the inorganic coating disposed on the metallic pigment substrate is a dielectric inorganic coating having an index of refraction of 1.65 or less. The inorganic coating having the index of refraction of 1.65 or less is selected from the group consisting of silicon oxide, silicon oxide hydrate, aluminum oxide, aluminum oxide hydrate, magnesium fluoride, and combinations thereof.

In this embodiment, the color effect-providing pigment optionally further includes a semi-transparent metal coating disposed on the inorganic coating. The semi-transparent metal coating most preferably includes aluminum. Alternatively, the semi-transparent metal coating is selected from the group consisting of aluminum, gold, copper, silver, and combination thereof.

The symmetrical, multilayer interference structure of the color effect-providing pigment, where the metallic pigment substrate is the chromium or nickel pigment substrate includes Al as the semi-transparent metal coating, $SiO_2$ or $MgF_2$ as the inorganic coating, and chromium or nickel as the metallic pigment substrate. Such color effect-providing pigments are commercially available from Flex Products, Inc., Santa Rosa, Calif., and are set forth in U.S. Pat. No. 5,135,812 and U.S. patent application Ser. No. 08/172,450, the disclosures of which are incorporated herein by reference in their entirety.

The metallic pigment substrate may alternatively be steel. In the context of the subject invention, it is to be understood that steel is an alloy of iron and from 0.02 to 1.5 parts carbon. If the metallic pigment substrate is steel, then it is most preferably stainless steel. One suitable example for more generally defining the steel pigment substrate is as an alloy of steel having from 1 to 30 parts by weight of chromium based on 100 parts by weight of the alloy of steel. In the most preferred embodiment, the metallic pigment substrate is selected from the group consisting of aluminum, chromium, nickel, steel, stainless steel, and combinations thereof.

As described above, the pigment substrate may be a non-metallic pigment substrate. The non-metallic pigment substrate has an index of refraction of 2.0, preferably 2.4 or greater. The non-metallic pigment substrate may be iron oxide, mica having an oxide coating, or combinations thereof. In an embodiment where the non-metallic pigment substrate is the mica having the oxide coating, the oxide coating is more specifically defined as a $TiO_2$ coating having a thickness of from 10 to 300 nm. As with the metallic pigment substrate, the non-metallic pigment substrate has an average particle size of from 5 to 50 microns. Preferably, the average particle size of the non-metallic pigment substrate is from 10 to 30, and most preferably from 15 to 20 microns.

With the non-metallic pigment substrate, the inorganic coating disposed on the substrate, is preferably selected from the group consisting of metal oxides, magnesium fluoride, and combinations thereof. Alternatively, the inorganic coating disposed on the non-metallic pigment substrate is selected from the group consisting of silicon oxide, silicon oxide hydrate, aluminum oxide, aluminum oxide hydrate, and combinations thereof. The inorganic coating has a thickness of from 20 to 800, preferably from 50 to 600, nm.

The color effect-providing pigment optionally further includes a reflective, absorbing coating disposed on the inorganic coating. The reflective, absorbing coating is selected from the group consisting of metals, metal oxides, metal sulfides, metal nitrides, and combinations thereof. The reflective, absorbing coating has a thickness of from 1 to 500, preferably from 10 to 150, nm.

The color effect-providing pigment optionally further includes an absorbing, outer coating. The absorbing, outer coating is different from and is disposed on the reflective, absorbing coating described above. Preferably, the absorbing, outer coating comprises a metal oxide. Alternatively, the absorbing, outer coating may be selected from the group consisting of silicon oxide, silicon oxide hydrate, aluminum oxide, aluminum oxide hydrate, tin oxide, titanium dioxide, zirconium oxide, iron (III) oxide, chromium (III) oxide, and combinations thereof.

The symmetrical, multilayer interference structure of the color effect-providing pigment, where the non-metallic pigment substrate is the iron oxide pigment substrate, includes $Fe_2O_3$ as the reflective, absorbing coating, $SiO_2$ as the inorganic coating, $Fe_2O_3$ as the non-metallic pigment substrate, $SiO_2$ as the inorganic coating, and $Fe_2O_3$ as the reflective, absorbing coating. That is, this color effect-providing pigment has a symmetrical, multilayer interference structure of $Fe_2O_3/SiO_2/Fe_2O_3/SiO_2/Fe_2O_3$. Such color effect-providing pigments having the non-metallic pigment substrate are commercially available from BASF Corporation, Southfield, Mich. as Variocrom® Magic Purple K 5511 (formerly ED 1480), and is set forth in U.S. Pat. No. 5,958,125, the disclosure of which is incorporated herein by reference in its entirety. With Variocrom® Magic Purple K 5511, the second color effect is produced as a result of a color shift from violet-to-gold. As above, it is to be understood that the color shift that produces the second color effect with the Variocrom® Magic Purple K 5511 is primarily driven by the thickness of the $SiO_2$ inorganic coating.

A coating system is also disclosed. The coating system includes the substrate, preferably the automotive body panel, having the first color effect. The coating system also includes the film layer of the powder-based coating composition as described above. The film layer is at least partially-transparent to visible light. As such, the most preferred coating system is where the powder-based coating composition is a powder clearcoat applied on the substrate to produce the second color effect.

The coating system may optionally include a second film layer. Preferably, the second film layer is also at least partially-transparent to visible light. The second film layer is applied on the film layer of the powder-based coating composition. The purpose of the application of the second film layer on the first film layer is primarily to enhance appearance characteristics, such as gloss, of the film layer, if necessary. For instance, the coating system may be a high-gloss coating system when the second film layer is included. More specifically, with the second film layer, the coating system utilizing the powder-based coating composition of the subject invention has a 20 degree gloss of at least 65, preferably of at least 75, as defined by ASTM D523-89 (Re-Approved 1999). Alternatively, the coating system utilizing the powder-based coating composition may have a 60 degree gloss of at least 75, preferably of at least 85, as defined by the same ASTM standard. The 20 and 60 degree glosses are preferably measured with a BYK-Gardner Micro-Gloss Meter, specifically Model No. GB-4501. Alternatively, a BYK-Gardner Haze-Gloss Meter, preferably Model Nos. GB-4601 and GB-4606, may be utilized having a different scale of gloss units. In general, if the powder-based coating composition according to the subject invention is not utilized as strictly a single-layer, powder clearcoat, then it may be utilized as a color-providing basecoat film layer with a second, non-pigmented clearcoat applied over the color-providing basecoat film layer.

The coating system may alternatively include an underlying film layer applied to the substrate prior to application of the film layer of the powder-based coating composition. Where the underlying film layer has been applied, the underlying film layer is the substrate to which the film layer of the powder-based coating composition is applied. As such, it is to be understood that the underlying film layer can be an electrocoat film layer, a primer surfacer film layer, or a color-providing base coat film layer as known in the art.

A method for coating the substrate is also disclosed. Generally, the method for coating the substrate to produce the second color effect upon application of the film layer is characterized by using the powder-based coating composition set forth above. More specifically, in the subject method, the powder-based binder and the color effect-providing pigment are combined to establish the powder-based coating composition. Preferably, the powder-based binder and the color effect-providing pigment are combined in amounts from 0.1 to 10, more preferably from 1 to 6, parts by weight of the color effect-providing pigment based on 100 parts by weight of the powder-based binder.

The step of combining the powder-based binder and the color effect-providing pigment varies depending on the embodiment of the subject invention. In one embodiment, the step of combining is further defined as dry blending the color effect-providing pigment into the powder-based binder. In the dry blending embodiment, it may be particularly important that the pigment substrate have an increased particle size toward the upper limit of from 5 to 50, preferably from 25 to 40, µm. The increased particle size of the pigment substrate in the dry blending embodiment is important to minimize pigment settling and flocculation concerns and also to ensure that the color-effect providing pigment produces the second color effect. The dry blending embodiment, further includes the step of agitating the dry blend of the color effect-providing pigment and the powder-based binder. As such, the color effect-providing pigment is uniformly dispersed throughout the powder-based binder.

In another embodiment, the step of combining is further defined as extruding the color effect-providing pigment into the powder-based binder. In the extruding embodiment, it may be particularly important that the pigment substrate is stainless steel such that the pigment substrate of the color effect-providing pigment can effectively withstand the forces typically involved in the extruding of the color effect-providing pigment. The extruding embodiment further comprises the step of milling the extrusion of the color effect-providing pigment and the powder-based binder to establish the powder-based coating composition.

Finally, the step of combining according to the various preferred embodiments may also be defined as bonding, more specifically impact bonding, the color effect-providing pigment with the powder-based binder.

The subject method further includes the step of applying the powder-based coating composition to the substrate. Upon application of the powder-based coating composition, the second color effect is produced as a result of the interaction of the inorganic coating and the pigment substrate with the first color effect of the substrate as described above. It is to be understood that the most preferred manner in which to apply the powder-based coating composition is by spray application. Finally, the film layer of the powder-based coating composition is cured such that the film layer produces the second color effect.

The following examples illustrating the formation of the powder-based coating composition according to the subject invention and illustrating certain properties of the film layer of the coating composition applied on the substrate, as presented herein, are intended to illustrate and not limit the invention.

EXAMPLES

The powder-based coating composition was prepared by adding and reacting the following parts, by weight, unless otherwise indicated.

| Example 1 Powder-Based Coating Composition Component | Amount (grams) |
|---|---|
| Powder-Based Binder | 95.0 |
| Color Effect-Providing Pigment | 5.0 |
| Total | 100.0 |

In Example 1, the powder-based binder was based on polyester and urethane resins and a blocked isocyanate cross-linking agent. The color effect-providing pigment utilized in Example 1 was Variocrom® Magic Purple K 5511 which produced the second color effect resulting in the color shifting from violet-to-gold. In Example 1, 5.0 grams of the color effect-providing pigment were combined with 95.0 grams of the powder-based binder. More specifically, 5.0 grams of the color effect-providing pigment were dry blended, through agitation, into the powder-based binder to uniformly disperse the color effect-providing pigment throughout the powder-based binder.

The powder-based coating composition was then spray applied onto a bare aluminum substrate to approximately 1 mil. The bare aluminum substrate is known in the automotive coating industry. A second, non-pigmented, powder-based coating composition was then spray applied to the film layer of the powder-based coating composition of the subject invention to approximately from 1 to 2 mils, for a total film build ranging from approximately 2 to 3 mils. The second, non-pigmented, powder-based coating composition was applied to optimize certain aesthetic properties. Standard cure conditions for the coating compositions were 20 mins.×400° F.

The completed film layer of the powder-based coating composition in Example 1 produced the second color effect having a general copper color. This second color effect differed from the first color effect, i.e., the natural color and appearance of the bare aluminum substrate, by $\Delta L$ 21.96, $\Delta a$ 14.08, and $\Delta b$ 19.36, measured according to CIELab color space.

A second example, Example 2, was prepared and sprayed as above in Example 1 except that the color effect-providing pigment utilized was Variocrom® Magic Red K 4411 which produced the second color effect resulting in the color shifting from red-to-yellow.

A third example, Example 3, utilized the powder-based coating composition of Example 1. In Example 3, the powder-based coating composition was spray applied over an aluminum substrate already coated with a solid black basecoat. Therefore, the first color effect resulted from the solid black basecoat, not from the aluminum substrate.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A curable, powder-based coating composition for coating a substrate, having a first color effect, with a film layer wherein application of the film layer to the substrate produces a second color effect different from the first color effect of the substrate, said powder-based coating composition comprising:

(A) a powder-based binder comprising the reaction product of;
  (I) a resin having a functional group, and
  (II) a cross-linking agent reactive with said functional group of said resin; and
(B) pigment consisting essentially of a color effect-providing pigment comprising;
  (I) a pigment substrate having first and second substantially parallel and planar surfaces, and
  (II) an inorganic coating disposed on at least one of said first and second substantially parallel and planar surfaces of said pigment substrate (B)(I), said inorganic coating (B)(II) having an index of refraction of 1.8 or less;
wherein said inorganic coating (B)(II) and said pigment substrate (B)(I) of said color effect-providing pigment (B) interact with the first color effect of the substrate to produce the second color effect upon application of the film layer of the powder-based coating composition to the substrate.

2. A powder-based coating composition as set forth in claim 1 wherein said color effect-providing pigment (B) further comprises a reflective, absorbing coating (B)(III) which is at least partially transparent to visible light.

3. A powder-based coating composition as set forth in claim 2 wherein said reflective, absorbing coating (B)(III) comprises a selectively absorbing metal oxide.

4. A powder-based coating composition as set forth in claim 2 wherein said reflective, absorbing coating (B)(III) comprises a non-selectively absorbing metal.

5. A powder-based coating composition as set forth in claim 2 wherein said reflective, absorbing coating (B)(III) is disposed on said inorganic coating (B)(II).

6. A powder-based coating composition as set forth in claim 5 wherein said color effect-providing pigment (B) further comprises an outer coating (B)(IV) disposed on said reflective, absorbing coating (B)(III).

7. A powder-based coating composition as set forth in claim 6 wherein said outer coating (B)(IV) is different from said reflective, absorbing coating (B)(III) and comprises a selectively absorbing metal oxide.

8. A powder-based coating composition as set forth in claim 1 wherein said pigment substrate (B)(I) of said color effect-providing pigment (B) is selected from the group consisting of metallic pigment substrates, non-metallic pigment substrates, and combinations thereof.

9. A powder-based coating composition as set forth in claim 1 wherein said pigment substrate (B)(I) of said color effect-providing pigment (B) is further defined as a platelet-shaped pigment substrate.

10. A powder-based coating composition as set forth in claim 1 wherein said color effect-providing pigment (B) has a multilayer interference structure that is symmetrical.

11. A powder-based coating composition as set forth in claim 1 wherein said inorganic coating (B)(II) of said color effect-providing pigment (B) comprises a metal oxide.

12. A powder-based coating composition as set forth in claim 1 wherein said inorganic coating (B)(II) of said color effect-providing pigment (B) is selected from the group consisting of metal oxides, magnesium fluoride, and combinations thereof.

13. A powder-based coating composition as set forth in claim 1 wherein said inorganic coating (B)(II) of said color effect-providing pigment (B) is selected from the group consisting of silicon oxide, silicon oxide hydrate, aluminum oxide, aluminum oxide hydrate, titanium oxide, titanium oxide hydrate, zinc sulfide, magnesium fluoride, and combinations thereof.

14. A powder-based coating composition as set forth in claim 1 wherein said pigment substrate (B)(I) is a metallic pigment substrate.

15. A powder-based coating composition as set forth in claim 14 wherein said metallic pigment substrate is aluminum.

16. A powder-based coating composition as set forth in claim 15 wherein said aluminum pigment substrate has an average particle size of from 5 to 50 μm.

17. A powder-based coating composition as set forth in claim 15 wherein said aluminum pigment substrate has a particle size distribution where 50% of said aluminum pigment substrate has a particle size of from 13 to 16 μm and where no more than 5% of said aluminum pigment substrate has a particle size of greater than 50 μm.

18. A powder-based coating composition as set forth in claim 15 wherein said inorganic coating (B)(II) disposed on said aluminum pigment substrate comprises a metal oxide.

19. A powder-based coating composition as set forth in claim 15 wherein said inorganic coating (B)(II) disposed on said aluminum pigment substrate is selected from the group consisting of silicon oxide, silicon oxide hydrate, aluminum oxide, aluminum oxide hydrate, and combinations thereof.

20. A powder-based coating composition as set forth in claim 15 wherein said inorganic coating (B)(II) disposed on said aluminum pigment substrate has a thickness of from 200 to 600 nm.

21. A powder-based coating composition as set forth in claim 15 wherein said color effect-providing pigment (B) further comprises a reflective, selectively absorbing metal oxide disposed on said inorganic coating (B)(II) wherein said reflective, selectively absorbing metal oxide has an index of refraction of 2.0 or greater and is at least partially transparent to visible light.

22. A powder-based coating composition as set forth in claim 21 wherein said color effect-providing pigment (B) further comprises an absorbing, outer coating different from and disposed on said reflective, selectively absorbing metal oxide.

23. A powder-based coating composition as set forth in claim 22 wherein said absorbing, outer coating is selected from the group of selectively absorbing oxides consisting of iron (III) oxide, chromium (III) oxide, vanadium (V) oxide, titanium (III) oxide, and combinations thereof.

24. A powder-based coating composition as set forth in claim 22 wherein said absorbing, outer coating is selected from the group of non-selectively absorbing oxides consisting of titanium dioxide, zirconium oxide, and combinations thereof.

25. A powder-based coating composition as set forth in claim 14 wherein said metallic pigment substrate is selected from the group consisting of chromium, nickel, and combinations thereof.

26. A powder-based coating composition as set forth in claim 25 wherein said color effect-providing pigment (B) has an average particle size of from 5 to 40 μm.

27. A powder-based coating composition as set forth in claim 25 wherein said color effect-providing pigment (B) has a particle size distribution where no more than 10% of said pigment (B) has a particle size of greater than 50 μm and substantially none of said pigment (B) has a particle size of greater than 125 μm.

28. A powder-based coating composition as set forth in claim 25 wherein said inorganic coating (B)(II) disposed on said metallic pigment substrate is a dielectric inorganic coating having an index of refraction of 1.65 or less.

29. A powder-based coating composition as set forth in claim 25 wherein said inorganic coating (B)(II) disposed on said metallic pigment substrate is selected from the group consisting of silicon oxide, silicon oxide hydrate, aluminum oxide, aluminum oxide hydrate, magnesium fluoride, and combinations thereof.

30. A powder-based coating composition as set forth in claim 25 wherein said color effect-providing pigment (B) further comprises a semi-transparent metal coating disposed on said inorganic coating (B)(II) wherein said semi-transparent metal coating comprises aluminum.

31. A powder-based coating composition as set forth in claim 25 wherein said color effect-providing pigment (B) further comprises a semi-transparent metal coating disposed on said inorganic coating (B)(II) wherein said semi-transparent metal coating is selected from the group consisting of aluminum, gold, copper, silver, and combinations thereof.

32. A powder-based coating composition as set forth in claim 14 wherein said metallic pigment substrate is steel.

33. A powder-based coating composition as set forth in claim 32 wherein said steel pigment substrate is stainless steel.

34. A powder-based coating composition as set forth in claim 32 wherein said steel pigment substrate is an alloy of steel having from 1 to 30 parts by weight of chromium based on 100 parts by weight of said alloy of steel.

35. A powder-based coating composition as set forth in claim 14 wherein said metallic pigment substrate is selected from the group consisting of aluminum, chromium, nickel, steel, stainless steel, and combinations thereof.

36. A powder-based coating composition as set forth in claim 1 wherein said pigment substrate (B)(I) is a non-metallic pigment substrate.

37. A powder-based coating composition as set forth in claim 36 wherein said non-metallic pigment substrate has an index of refraction 2.0 or greater.

38. A powder-based coating composition as set forth in claim 36 wherein said non-metallic pigment substrate is iron oxide.

39. A powder-based coating composition as set forth in claim 36 wherein said non-metallic pigment substrate is mica having an oxide coating.

40. A powder-based coating composition as set forth in claim 39 wherein said oxide coating is further defined as a $TiO_2$ coating having a thickness of from 10 to 300 nm.

41. A powder-based coating composition as set forth in claim 36 wherein said non-metallic pigment substrate is selected from the group of substrates consisting of iron oxide, mica having an oxide coating, and combinations thereof.

42. A powder-based coating composition as set forth in claim 41 wherein said non-metallic pigment substrate has an average particle size of from 5 to 50 μm.

43. A powder-based coating composition as set forth in claim 41 wherein said inorganic coating (B)(II) disposed on said non-metallic pigment substrate is selected from the group consisting of metal oxides, magnesium fluoride, and combinations thereof.

44. A powder-based coating composition as set forth in claim 41 wherein said inorganic coating (B)(II) disposed on said non-metallic pigment substrate is selected from the group consisting of silicon oxide, silicon oxide hydrate, aluminum oxide, aluminum oxide hydrate, and combinations thereof.

45. A powder-based coating composition as set forth in claim 41 wherein said inorganic coating (B)(II) disposed on said non-metallic pigment substrate has a thickness of from 20 to 800 nm.

46. A powder-based coating composition as set forth in claim 41 wherein said color effect-providing pigment (B) further comprises a reflective, absorbing coating disposed on said inorganic coating (B)(II) wherein said reflective, absorbing coating is selected from the group consisting of metals, metal oxides, metal sulfides, metal nitrides, and combinations thereof.

47. A powder-based coating composition as set forth in claim 41 wherein said color effect-providing pigment (B) further comprises a reflective, absorbing coating disposed on said inorganic coating (B)(II) wherein said reflective, absorbing coating has a thickness of from 1 to 500 nm.

48. A powder-based coating composition as set forth in claim 47 wherein said color effect-providing pigment (B) further comprises an absorbing, outer coating different from and disposed on said reflective, absorbing coating.

49. A powder-based coating composition as set forth in claim 48 wherein said absorbing, outer coating comprises a metal oxide.

50. A powder-based coating composition as set forth in claim 48 wherein said absorbing, outer coating is selected from the group consisting of silicon oxide, silicon oxide hydrate, aluminum oxide, aluminum oxide hydrate, tin oxide, titanium dioxide, zirconium oxide, iron (III) oxide, chromium (III) oxide, and combinations thereof.

51. A powder-based coating composition as set forth in claim 1 wherein said resin (A)(I) of said powder-based binder (A) is selected from the group consisting of acrylic resins, epoxy resins, phenolic resins, polyester resins, urethane resins, and combinations thereof.

52. A powder-based coating composition as set forth in claim 1 wherein said functional group of said resin (A)(I) is selected from the group consisting of epoxy functional groups, carboxy functional groups, hydroxy functional groups, and combinations thereof.

53. A powder-based coating composition as set forth in claim 1 wherein said cross-linking agent (A)(II) of said powder-based binder (A) is selected from the group consisting of aminoplasts, blocked isocyanates, polycarboxylic acids, acid anhydrides, polyamines, and combinations thereof.

54. A substrate having at least one surface that has been coated with the powder-based coating composition as set forth in claim 1.

55. A method of coating a substrate to produce the second color effect upon application of the film layer of the powder-based coating composition to the substrate, said method characterized by using the powder-based coating composition as set forth in claim 1.

56. A powder-based coating composition as set forth in claim 1 wherein said inorganic coating (B)(I) and said pigment substrate (B)(I) of said color effect-providing pigment (B) interact with the first color effect of the substrate such that the second color effect is different from the first color effect at least by $\Delta L$ 20.0, $\Delta a$ 10.0, and $\Delta b$ 15.0 as measured according to CIELab color space.

57. A powder-based coating composition as set forth in claim 1 wherein said coating composition is a powder clearcoat applied on the substrate to produce the second color effect.

58. A powder-based coating composition as set forth in claim 1 wherein the interaction of said inorganic coating (B)(II) and said pigment substrate (B)(I) with the first color effect of the substrate to produce the second color effect is further defined as interference of light waves that establishes angle-dependent color and lightness effects to achieve the second color effect.

59. A powder-based coating composition as set forth in claim 1 wherein the interaction of said inorganic coating (B)(II) and said pigment substrate (B)(I) with the first color effect of the substrate to produce the second color effect is further defined as absorption of light waves that establishes angle-dependent color and lightness effects to achieve the second color effect.

60. A powder-based coating composition as set forth in claim 1 wherein the interaction of said inorganic coating (B)(II) and said pigment substrate (B)(I) with the first color effect of the substrate to produce the second color effect is further defined as reflection of light waves that establishes angle-dependent color and lightness effects to achieve the second color effect.

61. A powder-based coating composition as set forth in claim 1 comprising from 0.1 to 10 parts by weight of said color effect providing pigment (B) based on 100 parts by weight of said powder-based binder (A).

\* \* \* \* \*